United States Patent Office 3,056,766
Patented Oct. 2, 1962

3,056,766
SULFONATION OF ALKENYLAROMATIC RESINS WITH SULFURIC ACID
Harold H. Roth, Bay City, Mich., assignor to The Dow Chemical Company, Midland, Mich., a corporation of Delaware
No Drawing. Filed Sept. 2, 1958, Ser. No. 758,582
3 Claims. (Cl. 260—79.3)

This invention relates to the sulfonation of benzene-soluble alkenylaromatic resins by reaction thereof with sulfuric acid to obtain resin sulfonic acids, and it particularly pertains to an improvement in such sulfonation process wherein the sulfuric acid sulfonation agent is employed in the form of a pre-formed dispersion of concentrated sulfuric acid in a liquid chlorinated hydrocarbon medium.

The starting resins with which this invention is concerned are benzene-soluble alkenylaromatic resins, by which term is meant solid addition polymers having recurring structural units at least 50 percent by weight of which correspond to at least one of the alkenylaromatic compounds having the general formula:

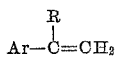

wherein the symbol Ar represents a monovalent aromatic radical having its valence bond on a carbon atom of a sulfonatable aromatic nucleus, the symbol R represents hydrogen or a methyl radical, and the other symbols have their usual meanings. Examples of such alkenylaromatic resins which can be sulfonated in accordance with the present invention are the solid homopolymers of styrene, α-methylstyrene, ar-methylstyrenes (ar-vinyltoluenes), ar-dimethylstyrenes, α,ar-dimethylstyrenes (ar-isopropenyltoluenes), ar-ethylstyrenes, vinylnaphthalenes, and ar-chlorostyrenes; copolymers of two or more of such alkenyl-aromatic compounds, e.g. copolymers of styrene and ar-vinyltoluene and of styrene and α-methylstyrene; and copolymers of one or more of such alkenylaromatic compounds and minor proportions, i.e. less than 50 percent by weight of the polymer, of other vinylidene compounds such as olefinic hydrocarbons, e.g. isobutylene and 1,3-butadiene, ethylenically unsaturated esters, e.g. from one to twelve carbon atom alkyl esters of acrylic or methacrylic acid, and acrylonitrile.

Polystyrene and other alkenylaromatic resins have heretofore been sulfonated by reaction thereof with sulfonation agents such as sulfuric acid, oleum, chlorosulfonic acid, sulfur trioxide, and complexes of sulfur trioxide with ethers and ketones.

While polystyrene and other alkenylaromatic resins have been sulfonated by reaction thereof with sulfuric acid to obtain incompletely sulfonated products and water-insoluble sulfonated products, the sulfonation of such alkenylaromatic resins with sulfuric acid to obtain water-swellable and water-soluble resin sulfonates has not been altogether satisfactory. Particular difficulty has been encountered in that the reaction mixture of an alkenylaromatic resin, per se or in solution in a liquid chlorinated hydrocarbon medium, and sulfuric acid rapidly converts to a gummy gelled mass which is difficult to stir or to transfer through pumps and pipelines. These operating difficulties are particularly grave when the operations are carried out on a large, e.g. commercial, scale.

It is among the objects of this invention to provide improvement in the sulfonation of benzene-soluble alkenyl aromatic resins of the kind described supra by reaction thereof with sulfuric acid to obtain water-swellable and water-soluble resin sulfonic acids. A more particular object is to provide improvement in the operating procedure for preparing a reaction mixture and carrying out a reaction of sulfuric acid and an alkenylaromatic resin in the presence of a liquid chlorinated aliphatic hydrocarbon as medium. Other objects and advantages of the invention will become apparent in the following description.

The objects of this invention have been attained in an improved process, fully set forth hereinafter, wherein concentrated sulfuric acid is pre-dispersed in a liquid chlorinated aliphatic hydrocarbon, the alkenylaromatic resin is dissolved in a separate portion of a liquid chlorinated aliphatic hydrocarbon, and the resulting sulfuric acid-containing and resin-containing compositions are mixed together.

The sulfuric acid for use in this process is preferably ordinary commercial-grade sulfuric acid, although any sulfuric acid can be used which has from 90 to 100 percent strength, i.e. from 90 to 100 percent by weight calculated as $H_2SO_4$.

Examples of liquid chlorinated aliphatic hydrocarbons suitable for use in this process are methylene chloride, chloroform, carbontetrachloride, ethylene dichloride, 1,1-dichloroethane, methylchloroform, trichloroethylene, perchloroethylene, 1,1,1,2-tetrachloroethane, 1,1,2,2-tetrachloroethane, and mixtures of liquid chlorinated aliphatic hydrocarbons.

The alkenylaromatic resins that have been described hereinbefore are suitable for use in this process.

In carrying out the present process, the alkenyl-aromatic resin to be sulfonated is dissolved in a liquid chlorinated aliphatic hydrocarbon solvent in a manner already known per se, in a convenient concentration, usually in the order of from 1 to 25 percent by weight of resin based on the solution.

The pre-dispersion of sulfuric acid in the liquid chlorinated aliphatic hydrocarbon can be prepared by mixing together the sulfuric acid and liquid chlorinated aliphatic hydrocarbon with agitation by any conventional means, e.g. by stirring, in convenient proportions, usually in the order of from 1 to 50 percent by weight of sulfuric acid based on the total dispersion, until the sulfuric acid is well emulsified. The resulting dispersion is maintained in such dispersed condition until combined with the resin solution.

The reaction between the sulfuric acid and the alkenyl-aromatic resin is carried out by mixing together the resulting sulfuric acid dispersion in liquid chlorinated aliphatic hydrocarbon medium and the resulting alkenyl-aromatic resin solution in liquid chlorinated aliphatic hydrocarbon solvent in proportions to get the desired degree of sulfonation of the resin, usually corresponding to from 1 to 10 mole-weights of sulfuric acid per mole-weight of alkenylaromatic compound in the resin to be sulfonated.

The concentration of the sulfuric acid in the starting dispersion in its organic medium need not be, and usually is not, the same as the concentration of the resin in its starting solution. Usually, the concentration of the sulfuric acid in its starting dispersion is considerably greater than is the concentration of the resin in its starting solution. The concentrations of the reactants in their respective starting compositions and the proportions thereof that are mixed together are selected to provide a reaction mixture in which the molar proportion of the reactants is as described above and in which the amount of resulting resin sulfonic acid product corresponds to a convenient proportion, usually in the order of from 1 to 25 percent by weight, of the reaction mixture.

The sulfonation reaction between the alkenylaromatic resin and the sulfuric acid is carried out by maintaining the resulting reaction mixture at reaction temperatures, usually between 0° C. and 200° C., preferably between 0° C. and 100° C., at any convenient pressure, for a time sufficient to render the resin sulfonic acid product at least swellable in water. The time required varies with the process parameters, usually being inverse to the temperature and to the concentration of reactants. Some resin starting materials such as poly(ar-vinyltoluene) react more rapidly than do others such as polystyrene. The course of the reaction can be followed by withdrawing a sample of the sulfonated product from the reaction mixture from time to time and testing the swellability and solubility of the sample in water or analytically titrating the acidity of the resin sulfonic acid product.

During the course of at least the early stages of the sulfonation reaction in accordance with this invention, the reaction mixture prepared as described above from a pre-dispersion of the sulfuric acid in the liquid organic medium is stirrable and pumpable. As the reaction proceeds, the reaction mixture becomes thickened, i.e. the viscosity increases, with the formation of a slurry of partially sulfonated resin. Near the end of the sulfonation reaction, as the resin becomes more completely sulfonated, the viscosity of the slurry decreases with the formation of a slurry of solid granules of the resin sulfonic acid in the liquid organic medium.

The resin sulfonic acid product can be recovered from the resulting sulfonation reaction mixture in usual ways, e.g. by decanting or filtering the liquid from the solid resin sulfonic acid and evaporating residual chlorinated aliphatic hydrocarbon from the latter. The resin sulfonic acid can be converted to salts by reaction with base-forming reagents and can be used in ways and for purposes already known per se for such alkenylaromatic resin sulfonic acids.

The following examples illustrate the invention but should not be construed as limiting its scope.

*Example 1*

Into a sulfonation reactor having a paddle stirrer and means for excluding air with a stream of dry nitrogen, were placed 300 ml. of anhydrous methylene chloride and 75 ml. of commercial-grade 98 percent sulfuric acid. The mixture was stirred to disperse the sulfuric acid into the organic liquid at room temperature. To the resulting dispersion was added a solution of 30 grams of poly-(ar-vinyltoluene) in 300 ml. of dry methylene chloride. The poly(ar-vinyltoluene) was a thermoplastic, solid, benzene-soluble polymer prepared from a mixture of approximately 60 percent m-vinyltoluene and approximately 40 percent p-vinyltoluene. A solution of the starting polymer in nine times its weight of toluene had a viscosity of 1,850 centipoises at 25° C.

The mixture of the sulfuric acid-containing dispersion and the polymer-containing solution was maintained at room temperature, circa 25° C., with continued stirring. The viscosity of the reaction mixture increased. After approximately eight minutes, the viscosity was estimated to be in the order of 15,000 centipoises and the stirring power was increased. Two minutes later, the viscosity decreased rapidly to an estimated 300 centipoises. After a further forty minutes, two separate phases were noticeable in the reaction mixture. After a total reaction time of approximately five hours, the resin sulfonic acid was water-soluble. From the resulting reaction mixture, 520 ml. of clear methylene chloride was decanted. The resin sulfonic acid was recovered in the usual way.

When the foregoing procedure was repeated using, in separate tests, 90 and 60 mls. of commercial-grade sulfuric acid, the times required for the resin sulfonic acid product to become water-soluble were 1.5 hours and 25 hours, respectively.

In place of the particular ar-vinyltoluene polymer employed in the foregoing example, samples of similar polymers, differing as to molecular weight, whose solutions in nine times their weight of toluene had viscosities at 25° C. ranging from approximately 17 to approximately 9,500 centipoises, were used with substantially the same results except that the lower molecular weight (lower viscosity) polymers reached water solubility in shorter reaction times than did the higher molecular weight polymers.

In place of the ar-vinyltoluene polymer used in Example 1, there was used a polystyrene whose solution in nine times its weight of toluene had a viscosity of 1350 centipoises. Approximately four times as long a reaction period was required to produce a water-soluble resin sulfonate as was required for the ar-vinyltoluene polymer.

*Example 2*

The starting alkenylaromatic polymer employed in this example was a benzene-soluble, thermoplastic, solid copolymer of 0.75 percent by weight acrylonitrile and 99.25 percent by weight of a mixture of isomeric ar-vinyltoluenes containing approximately 60 percent m-vinyltoluene and approximately 40 percent p-vinyltoluene. A solution of the copolymer in nine times its weight of toluene had a viscosity of 3916 centipoises at 25° C.

A solution of 10 grams of the copolymer in 100 ml. of dry carbon tetrachloride was added to a pre-dispersion of 25 ml. of commercial-grade concentrated (98 percent) sulfuric acid in 100 ml. of carbon tetrachloride, the pre-dispersion and the resulting mixture with the copolymer solution being vigorously agitated at room temperature in a high speed rotating blade homogenizer. The high speed stirrer was stopped 30 seconds after mixing the reactants together. The resulting reaction mixture remained fluid and pumpable with eventual formation of a slurry of solid particles of the resin sulfonic acid product suspended in a liquid medium.

In contrast to these results, when a similar solution of 10 grams of the described copolymer in 100 mls. of carbon tetrachloride was mixed with 25 mls. of commercial-grade concentrated (98 percent) sulfuric acid, not pre-dispersed, otherwise using the same procedure, apparatus, and kind of agitation, an intractable gummy mass formed in approximately five seconds.

In place of the alkenylaromatic resins used in the foregoing examples, there can be used other of the benzene-soluble solid alkenylaromatic resins of the kind hereinbefore defined. Other liquid chlorinated aliphatic hydrocarbons or mixtures thereof can be used in place of the ones used in these examples with substantially the same results.

What is claimed is:

1. In a method wherein a benzene-soluble solid alkenyl aromatic resin is dissolved in an anhydrous liquid chlorinated aliphatic hydrocarbon and sulfonated by reaction with sulfuric acid to form a resin sulfonate in a reaction mixture consisting of the alkenyl aromatic resin, the chlorinated aliphatic hydrocarbon, the sulfuric acid, and the products of the resulting sulfonation reaction, and wherein the starting solid alkenyl aromatic resin consists of an addition polymer of ethylenically unsaturated monomers at least 50 percent by weight of which has the general formula:

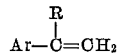

wherein the radical Ar— is a monovalent aromatic radical having its valence bond on a carbon atom of a sulfonatable aromatic nucleus and the radical R— is a member of the group consisting of hydrogen and methyl radicals, the chlorinated aliphatic hydrocarbon has in its molecular structure from one to two carbon atoms and at least two chlorine atoms, and the sulfuric acid is from 90 to 100 percent strength, the improvement which comprises predispersing the said starting sulfuric acid into a portion of the said starting liquid chlorinated aliphatic hydrocarbon in amounts of from 1 to 50 percent by weight of the said sulfuric acid based on the resulting dispersion to form an emulsion of the sulfuric acid in the chlorinated aliphatic hydrocarbon, mixing the resulting emulsion with a solution of from 1 to 25 percent by weight of the aforementioned starting alkenyl aromatic resin in the remaining portion of the said starting liquid chlorinated aliphatic hydrocarbon, the sulfuric acid emulsion and the solution of the alkenyl aromatic resin being admixed in amounts of from 1 to 10 mole-weights of sulfuric acid per mole weight of the alkenyl aromatic monomer unit in the resin and in amounts such as to provide from 1 to 25 percent by weight of the resulting resin sulfonic acid based on the whole reaction mixture, and maintaining the resulting reaction mixture at reaction temperatures between 0° and 200° C.

2. The improvement according to claim 1 wherein the liquid chlorinated aliphatic hydrocarbon is methylene chloride.

3. The improvement according to claim 1 wherein the starting polymer is a benzene-soluble solid addition polymer of ar-vinyltoluene.

References Cited in the file of this patent

UNITED STATES PATENTS

| | | |
|---|---|---|
| 2,604,461 | Roth | July 22, 1952 |
| 2,763,634 | Teot | Sept. 18, 1956 |